No. 723,944. PATENTED MAR. 31, 1903.
G. W. TICE.
CORN HUSKER AND SHREDDER.
APPLICATION FILED JULY 11, 1901.
NO MODEL. 4 SHEETS—SHEET 1.
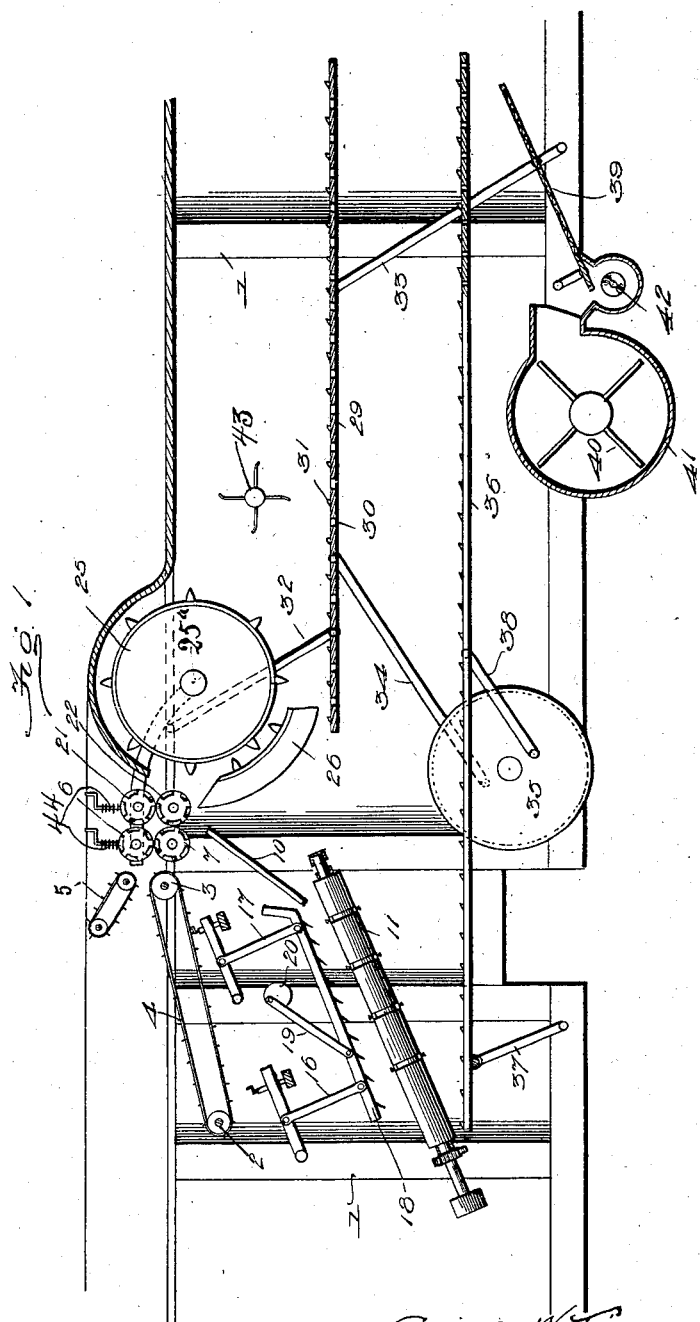
Witnesses
George W. Tice, Inventor
by Victor J. Evans
Attorney No. 723,944. PATENTED MAR. 31, 1903.
G. W. TICE.
CORN HUSKER AND SHREDDER.
APPLICATION FILED JULY 11, 1901.
NO MODEL. 4 SHEETS—SHEET 2.
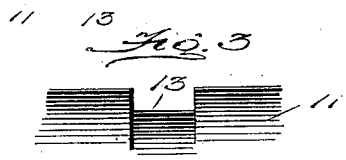
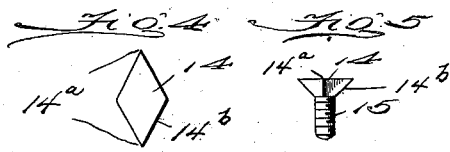
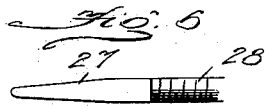
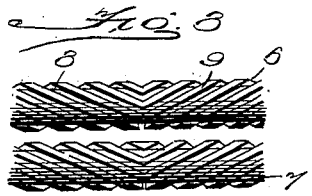
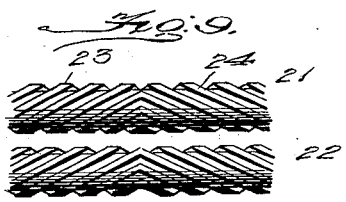

No. 723,944. PATENTED MAR. 31, 1903.
G. W. TICE.
CORN HUSKER AND SHREDDER.
APPLICATION FILED JULY 11, 1901.
NO MODEL. 4 SHEETS—SHEET 3.
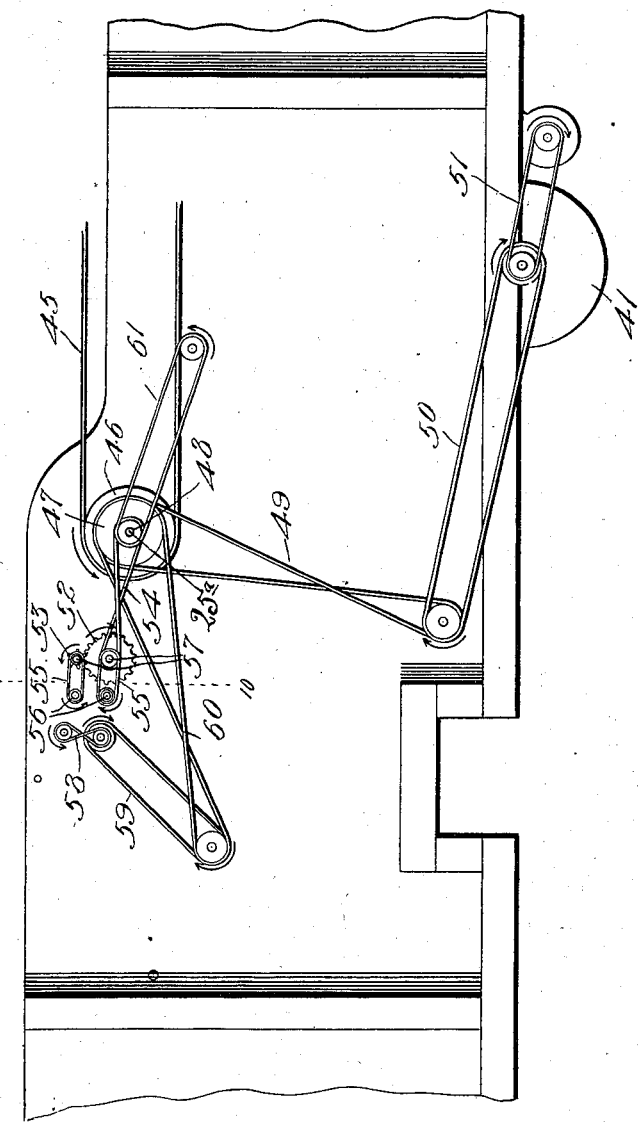
Witnesses
Inventor
George W. Tice,
By Victor J. Evans
Attorney

UNITED STATES PATENT OFFICE.

GEORGE W. TICE, OF MEMPHIS, MICHIGAN.

CORN HUSKER AND SHREDDER.

SPECIFICATION forming part of Letters Patent No. 723,944, dated March 31, 1903.

Application filed July 11, 1901. Serial No. 67,900. (No model.)

*To all whom it may concern:*

Be it known that I, GEORGE W. TICE, a citizen of the United States, residing at and whose post-office address is Memphis, in the county of St. Clair and State of Michigan, have invented new and useful Improvements in Corn-Huskers and Fodder-Shredders, of which the following is a specification.

My invention relates to corn-huskers and fodder-shredders; and its object is to simplify and increase the efficiency of machines of this character and to insure a thorough treatment of the fodder and a complete separation of the husks and fodder from the shelled corn.

The construction of the improvement and its characteristic features will be fully described hereinafter in connection with the accompanying drawings, which form part of this specification, and its points of novelty will be defined in the appended claims.

Figure 11:
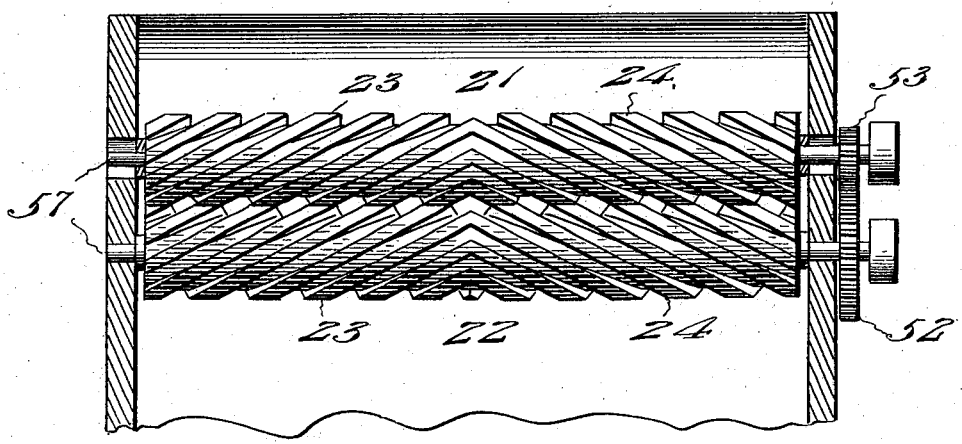
Figure 12:
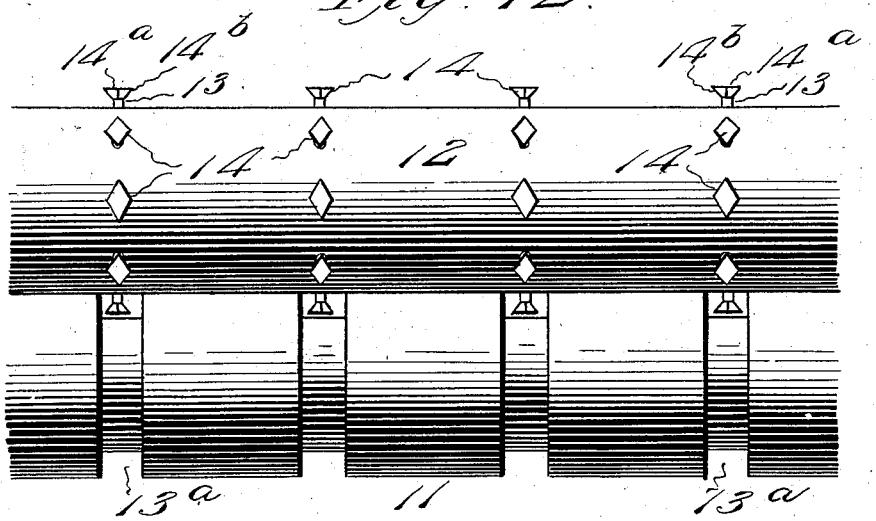

In the drawings, Figure 1 is a longitudinal vertical section, partly in elevation, of a machine embodying the invention. Fig. 2 is a plan view of the husking-rollers detached. Fig. 3 is a detail view, on an enlarged scale, of a portion of one of the husking-rollers. Fig. 4 is a plan view of one of the husking-pins projecting from one of the husking-rollers. Fig. 5 is a side elevation of the husking-pin. Fig. 6 is an edge view of one of the shredding-teeth. Fig. 7 is an elevation of the same. Fig. 8 is a detail elevation of one pair of snapping-rolls, and Fig. 9 is a similar view of the other pair of shredding-rolls. Fig. 10 is a fragmentary side elevation of the machine, illustrating the manner of imparting motion to the moving parts thereof. Fig. 11 is a transverse sectional view on line 10 10 of Fig. 10. Fig. 12 is a view similar to Fig. 2, on an enlarged scale.

Referring now to Fig. 1, the reference-numeral 1 designates the frame of the machine, formed with suitable bearings for the shafts and other operative parts of the mechanism.

At the front end of the machine upon parallel rollers 2 and 3 is arranged an endless carrier or traveling table 4, coacting with a shorter endless carrier 5, supported above the carrier 4. These carriers 4 and 5 are disposed at opposite inclinations and deliver the cornstalks to the snapping-rolls 6 and 7.

The faces of these rolls, as shown in Fig. 8, are formed with diagonally-disposed right and left hand grooves 8 and 9, formed with spiral ribs and intervening grooves inclined in opposite directions from the middle of the length of the roll, and the upper roll 6 is revolved more rapidly than its lower companion roll 7 to effect a shaving action to sever the ears from the stalks and prevent the ears from passing between the rolls. The greater peripheral speed of the roll 6 than that of the roll 7, in connection with the opposite spiral arrangement, causes the oppositely-inclined grooves in the rolls to spread the bundle of fodder, so that the ears will be readily and evenly distributed to the husking-rolls.

After the ears are severed from the stalks by the action of the snapping-rolls 6 and 7 they are directed by incline 10 to a pair of husking-rolls 11 and 12, supported in inclined position longitudinally of the machine. One of these rolls 11 is formed with a series of annular grooves 13, and the other roll carries rows of husking-pins, each comprising a diamond-shaped head 14 and a threaded shank 15. The rows of pins, as shown in Fig. 2, register with the grooves $13^a$ and project therein, and the roll 12 is revolved at a speed greater than that of the roll 11.

The husking-pins 13, through the virtue of their diamond-shaped heads are provided with engaging points $14^a$ and reversely-tapered sides $14^b$, which provide when the heads 14 occupy their normal position in the grooves, wedge-shaped spaces between the walls of the grooves, and the sides to permit of the temporary clamping of the husks.

It will be perceived that a partial revolution of the husking-roll will bring one of the points $14^a$ of each head into contact with the husks and that a further revolution thereof will cause the pins to direct and bind the same in the grooves between the walls thereof and the sides of the heads. A still further revolution of the rolls will strip the husks from the ears and deposit them beneath the rolls. The husking-pins may be reversed to present one or the other of the points $14^a$ in a position to act upon the husks when it is found advantageous to overcome the wear upon the points.

Above the husking-rolls is suspended a vibrating adjustable guide comprising pivoted arms 16 and 17, a toothed plate 18, and a link 19, connecting the plate 18 with a crank-disk 20. The function of this vibrating guide is to keep the ears in proper position to be operated upon by the husking-rolls.

The stalks pass between the rolls 6 and 7 and thence through a second pair of bruising and shredding rolls 21 and 22. These rolls are also formed with diagonally-extending right and left hand grooves 23 and 24; but said grooves are an opposing pitch to those of the rolls 6 and 7, thus insuring a thorough bruising of the stalks before they pass rearward to the shredding-cylinder 25 and concave 26. The cylinder 25 and the working surface of the concave are provided with teeth of the form shown in Figs. 6 and 7, each comprising a head 27 and a shank 28. From the cylinder 25 the fodder passes to a shaker 29, suspended in horizontal position below the cylinder and formed with openings 30 and upon the upper surface with spurs or teeth 31. The shaker is supported by pivoted rods 32 and 33 and connected by a link 34 with a crank-disk 35, whereby a longitudinal reciprocating motion is imparted to the shaker. Any loose corn mixed with the fodder drops through the shaker and is saved, and the shaker also serves to separate or sift out dirt from the fodder. Below the shaker 29 is a second shaker 36, supported by rods 37 and connected by a link 38 with the crank-disk 35.

All loose corn or dirt dropping through the shaker finds its way to an incline 39, in rear of which is located a fan 40, inclosed in the casing 41. The fan serves to blow out the dirt and dust and allow the corn to drop into a suitable conveyer located at the point 42.

A transverse beater 43 is preferably arranged above the shaker 31.

The rolls 6 and 7 and 21 and 22 are tensioned and held together by springs 44, as shown in Fig. 1.

In Fig. 10 I have illustrated the preferred manner of imparting motion to the several moving elements of my improved machine, and the reference-numeral 45 therein designates the main driving-belt, passing around a pulley 46 upon the shaft 25ª of the cylinder 25, whereby motion is imparted thereto. The shaft has also mounted thereon pulleys 47 and 48, the pulley 47 being adapted to impart motion to the crank-disk 35, the fan 40, and the conveyer 42 through the medium of belts 49, 50, and 51, which are adapted to pass around suitable pulleys mounted on the shafts of the above-named elements. The shaft of the bruising and crushing roll 22 is provided with a pinion 52, adapted to mesh with a smaller pinion 53, carried by the shaft of the roll 21, whereby when the roll 22 is caused to revolve through the medium of a belt 54 the roll 21 is revolved in an opposite direction thereto, and at a greater rate of speed. The snapping-rolls 6 and 7 have motion imparted thereto by means of belts 55, adapted to pass around pulleys 56 and 57, carried by the shafts of the snapping and bruising and crushing rolls, respectively. It will be perceived that as the rolls 6 and 7 are indirectly driven by the rolls 21 and 22 the roll 6 will have a greater peripheral speed than its companion roll 7, whereby the results hereinbefore pointed out may be obtained. The endless carriers 4 and 5, the toothed plate 18, and the beater 43 derive their motion through belts 58, 59, 60, and 61, and the husking-rolls 11 and 12 may be geared in any well-known manner to have motion imparted thereto through the medium of a belt suitably connected to one of the pulleys 47 or 48 and to such a gearing.

I claim—

1. The combination in a machine of the character described, of a pair of snapping-rolls located one above the other, and each formed with spiral ribs and intervening grooves inclined in opposite directions from the middle of the length of the rolls, and means for rotating one of the rolls at a greater speed than its companion roll, whereby a shearing and uniform distributing action is effected.

2. In a corn-husker and fodder-shredder, the combination of a pair of snapping-rolls, each formed with spiral ribs and intervening grooves inclined in opposite directions from the middle of the length of the roll, means for rotating one of the rolls at a greater speed than its companion roll, a pair of shredding-rolls arranged in the rear of the snapping-rolls and each formed with spiral ribs inclined in opposite directions from the middle of the roll, said ribs being disposed in opposition to those of the snapping-rolls.

3. The combination with a pair of husking-rolls, one of which is provided with a series of annular grooves, of husking-pins secured to the other roll, and provided with diamond-shaped heads adapted to fit in the grooves to provide a wedge-shaped space between the walls of the grooves and edges of the heads, substantially as described.

In testimony whereof I affix my signature in presence of two witnesses.

GEORGE W. TICE.

Witnesses:
 CHAS. J. KESNER,
 SETH E. FRYMIRE.